US011147058B2

(12) United States Patent
Shi et al.

(10) Patent No.: US 11,147,058 B2
(45) Date of Patent: Oct. 12, 2021

(54) COMMUNICATION METHOD AND RELATED DEVICE (71) Applicant: VIVO MOBILE COMMUNICATION CO., LTD., Guangdong (CN)

(72) Inventors: Yuan Shi, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/960,538

(22) PCT Filed: Jan. 10, 2019

(86) PCT No.: PCT/CN2019/071137
§ 371 (c)(1),
(2) Date: Jul. 7, 2020

(87) PCT Pub. No.: WO2019/137423
PCT Pub. Date: Jul. 18, 2019

(65) Prior Publication Data
US 2021/0068087 A1 Mar. 4, 2021

(30) Foreign Application Priority Data
Jan. 11, 2018 (CN) .......................... 201810026261.9

(51) Int. Cl.
H04W 72/04 (2009.01)
H04W 56/00 (2009.01)
H04W 72/08 (2009.01)

(52) U.S. Cl.
CPC ....... *H04W 72/042* (2013.01); *H04W 56/001* (2013.01); *H04W 72/085* (2013.01); *H04W 72/0453* (2013.01)

(58) Field of Classification Search
CPC ............. H04W 56/001; H04W 74/042; H04W 72/085
See application file for complete search history.

(56) References Cited

U.S. PATENT DOCUMENTS 10,523,300 B2 * 12/2019 Malik ................. H04B 7/0404
2017/0353257 A1 12/2017 Islam et al.

FOREIGN PATENT DOCUMENTS

CN 103067987 A 4/2013
CN 103326839 A 9/2013

OTHER PUBLICATIONS

CN Office Action in Application No. 201810026261.9 dated Oct. 21, 2020.
"On PRB bundling for DL" 3GPP TSG RAN WG1 Meeting 90bis, Oct. 9, 2017.
"Working Assumptions for RMSI CORESETs" 3GPP TSG RAN WG1 Meeting 91, Nov. 27, 2017.
(Continued)

*Primary Examiner* — Curtis B Odom
(74) *Attorney, Agent, or Firm* — Maschoff Brennan (57) ABSTRACT The present disclosure provides a communication method and related devices. The method includes: before obtaining remaining minimum system information (RMSI) transmitted by a network device, partitioning precoding resource block groups (PRGs) on an initial bandwidth part (BWP); and, communicating with the network device on the initial bandwidth part.

20 Claims, 4 Drawing Sheets (56) References Cited

OTHER PUBLICATIONS

EP Search Report in Application No. 19738151.0 dated Feb. 4, 2021.
"Remaining details on Remaining minimum system information delivery" 3GPP TSG RAN WG1 Meeting 91, NTT DOCOMO, INC., R1-1720791, Nov. 27, 2017.
"Remaining Issues and Text Proposals on PRB Bundling for DL" 3GPP TSG RAN WG1 AH 1801, vivo, R1-1800182, Jan. 22, 2018.

* cited by examiner

COMMUNICATION METHOD AND RELATED DEVICE

CROSS-REFERENCE TO RELATED APPLICATION

The present disclosure is the U.S. national phase of PCT Application PCT/CN2019/071137 filed on Jan. 10, 2019, which claims the benefit and priority of Chinese Application No. 201810026261.9, filed on Jan. 11, 2018, the disclosures of which are incorporated in their entirety by reference herein.

TECHNICAL FIELD

The present disclosure relates to the field of communication technologies, and in particular to a communication method and related devices.

BACKGROUND

When a User Equipment (UE) accesses a network device or is in an idle state, it needs to read broadcast information. The broadcast information includes remaining minimum system information (RMSI), other system information (OSI), and paging information, etc. Before the UE obtains the RMSI, the UE obtains very few information from the network device, only obtaining physical cell identifier (PCI), timing (or timing sequence), etc. However, the grid partitioning of the precoding resource block groups (PRGs) in the related art is performed from a starting reference point of a current component carrier (CC), thus, before the mobile communication terminal obtains the RMSI, the UE cannot perform grid partitioning according to a PRG partitioning method in the related art, resulting in poor demodulation performance of the resource block (RB).

SUMMARY

Embodiments of the present disclosure provide a communication method and related devices, which can solve the problems of poor demodulation performance of the resource block (RB).

In order to solve the above technical problem, the present disclosure is implemented as follows.

In a first aspect, one embodiment of the present disclosure provides a communication method applied to a mobile communication terminal, including:

before obtaining remaining minimum system information (RMSI) transmitted by a network device, partitioning precoding resource block groups (PRGs) on an initial bandwidth part (BWP); and communicating with the network device on the initial bandwidth part.

In a second aspect, one embodiment of the present disclosure provides a communication method applied to a network device, including:

before a mobile communication terminal obtains remaining minimum system information (RMSI) transmitted by the network device, partitioning precoding resource block groups (PRGs) on an initial bandwidth part (BWP);

communicating with the mobile communication terminal on the initial bandwidth part.

In a third aspect, one embodiment of the present disclosure provides a mobile communication terminal, including:

a first partitioning module configured to, before obtaining remaining minimum system information (RMSI) transmitted by a network device, partition precoding resource block groups (PRGs) on an initial bandwidth part (BWP);

a first communication module configured to communicate with the network device on the initial bandwidth part.

In a fourth aspect, one embodiment of the present disclosure provides a network device, including:

a third partitioning module configured to, before a mobile communication terminal obtains remaining minimum system information (RMSI) transmitted by the network device, partition precoding resource block groups (PRGs) on an initial bandwidth part (BWP);

a third communication module configured to communicate with the mobile communication terminal on the initial bandwidth part.

In a fifth aspect, one embodiment of the present disclosure provides a mobile communication terminal, including:

a processor, a memory, and a computer program stored on the memory and executable on the processor; wherein the processor executes the computer program to implement steps of the above communication method.

In a sixth aspect, one embodiment of the present disclosure provides a network device, including: a processor, a memory, and a computer program stored on the memory and executable on the processor; wherein the computer program is executed by the processor to implement steps of the above communication method.

In a seventh aspect, one embodiment of the present disclosure provides a computer readable storage medium including a computer program stored thereon, wherein the computer program is executed by a processor to implement the steps of the above communication method.

In this way, in embodiments of the present disclosure, before obtaining the RMSI transmitted by the network device, the PRGs are partitioned on the initial bandwidth part. Therefore, the performance of demodulating resource blocks can be improved according to the embodiment of the present disclosure.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions of the present disclosure will be described hereinafter in a clear and complete manner in conjunction with the drawings of embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure. The terms such as "first" and "second" used in the specification and claims are merely used to differentiate different components rather than to represent any order or number. It is to be understood that the data so used may be interchanged where appropriate, such that the embodiments of the present application described herein may be implemented in a sequence other than those illustrated or described herein. In addition, the terms "include" or its variations in the specification and claims of the present application are intended to encompass a non-exclusive inclusion, such that a process, method, system, product, or device that include a series of steps or units include not only those steps or units but also other steps or units that are not explicitly listed, or steps or units that are inherent to such process, method, product, or device. In addition, "and/or" used in the specification means at least one of connected objects, for example, A and/or B, means that there are three cases of including a single A, including a single B, and including both A and B.

Figure 1:
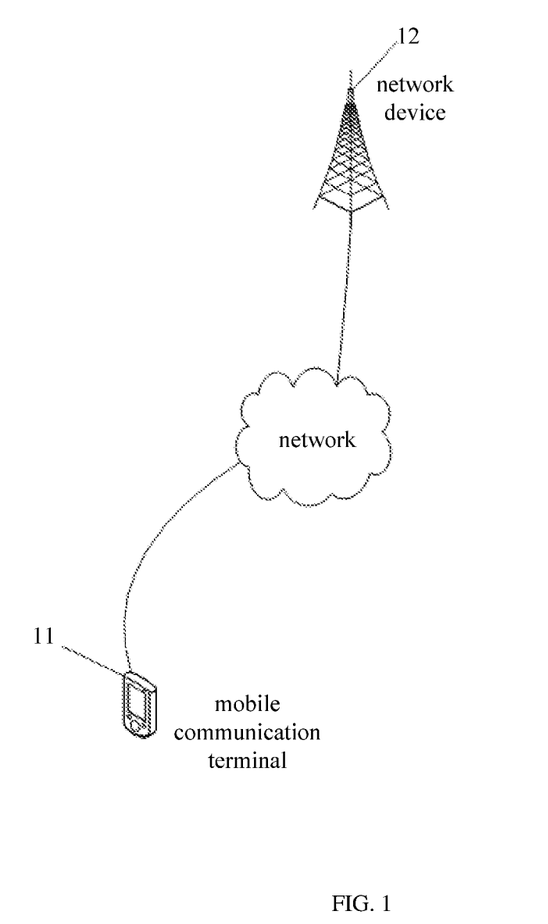
FIG. 1 is a schematic diagram of an applicable network architecture according to an embodiment of the present disclosure.

Referring to FIG. 1, FIG. 1 is a schematic diagram of an applicable network architecture according to an embodiment of the present disclosure. As shown in FIG. 1, the network architecture includes a user equipment (UE) 11 and a network device 12. The user equipment 11 may be a mobile phone, a tablet personal computer, a laptop computer, a personal digital assistant (PDA), a mobile internet device (MID), or a wearable device and other terminal devices. It should be noted that the specific type of the user terminal 11 is not limited in the embodiment of the present disclosure. The network device 12 may be a macro station, an LTE eNB, a 5G NR NB, or the like. The network device 12 may also be a small station, such as a low power node (LPN) pico, a femto, or the like. The network device 12 may be an access point (AP). The base station may also be a network node formed by a central unit (CU) and a plurality of transmission reception Points (TRPs) managed and controlled by the central unit (CU). It should be noted that the specific type of the network device 12 is not limited in the embodiment of the present disclosure. Embodiments of the present disclosure may be applied to, for example, 5G and future evolved communication systems, but are not limited thereto.

Figure 2:
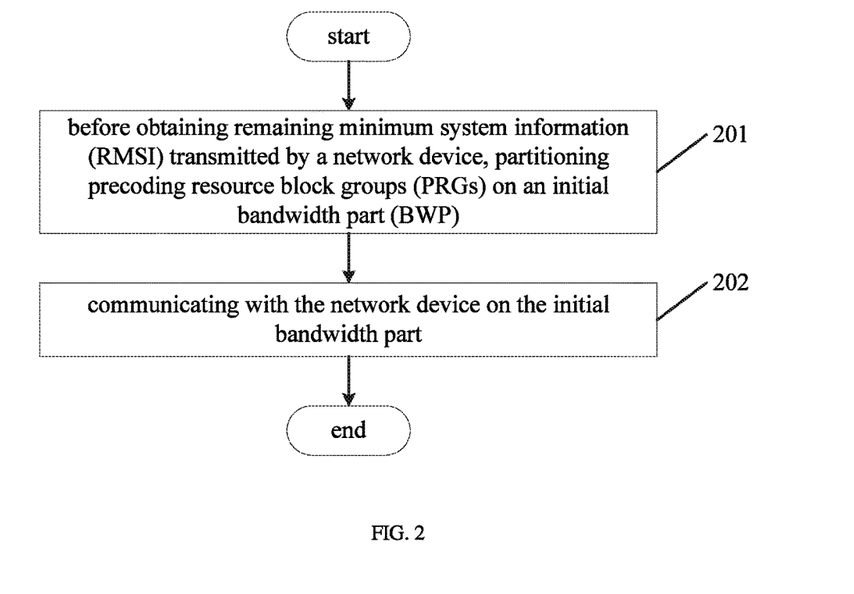
FIG. 2 is a first flowchart of a communication method according to an embodiment of the present disclosure.

Referring to FIG. 2, FIG. 2 is a flowchart of a communication method according to an embodiment of the present disclosure. As shown in FIG. 2, the method includes the following steps.

Step 201: before obtaining remaining minimum system information (RMSI) transmitted by a network device, partitioning precoding resource block groups (PRGs) on an initial bandwidth part (BWP).

The communication method provided in one embodiment of the present disclosure is mainly applied to a mobile communication terminal, and is used for controlling communication between the mobile communication terminal and the network device.

Specifically, the network device may broadcast a synchronization signal block (SSB); and after the mobile communication terminal obtains the SSB, based on the SSB, the mobile communication terminal may perform PRG partitioning on an initial bandwidth part indicated by the SSB. It should be noted that the partitioning manner of PRG may be set according to actual needs, for example, the PRG partitioning may be performed according to a position of the SSB, or the PRG partitioning may be performed according to other related information obtained according to the SSB. For example, the SSB carries indication information of the initial bandwidth part, and then the PRGs may be partitioned according to a position of the initial bandwidth part determined by the indication information.

The initial bandwidth part is a bandwidth part defined by the standard, for example, it may be an initial bandwidth part defined by RAN4.

Step 202: communicating with the network device on the initial bandwidth part.

After partitioning the PRG, data or control information may be transmitted with the network device on the initial bandwidth part based on the partitioned PRG.

In this way, in one embodiment of the present disclosure, before obtaining the RMSI transmitted by the network device, the precoding resource block groups (PRGs) are partitioned on the initial bandwidth part. Therefore, the performance of demodulating resource blocks can be improved according to the embodiment of the present disclosure.

It should be noted that, the above RMSI includes indication information, and the indication information is used to indicate component carrier and bandwidth part (BWP) configured by the network device for the mobile communication terminal. The method further includes:

Step 203: after obtaining the RMSI transmitted by the network device, partitioning the PRGs on the BWP from a starting reference point of the component carrier.

Step 204: communicating with the network device on the BWP.

In one embodiment, after obtaining the RMSI transmitted by the network device, partitioning the PRGs on the BWP from the starting reference point of the component carrier is a PRG partitioning rule specified in an existing standard protocol, and specific partitioning modes are not repeated here.

Figure 3:
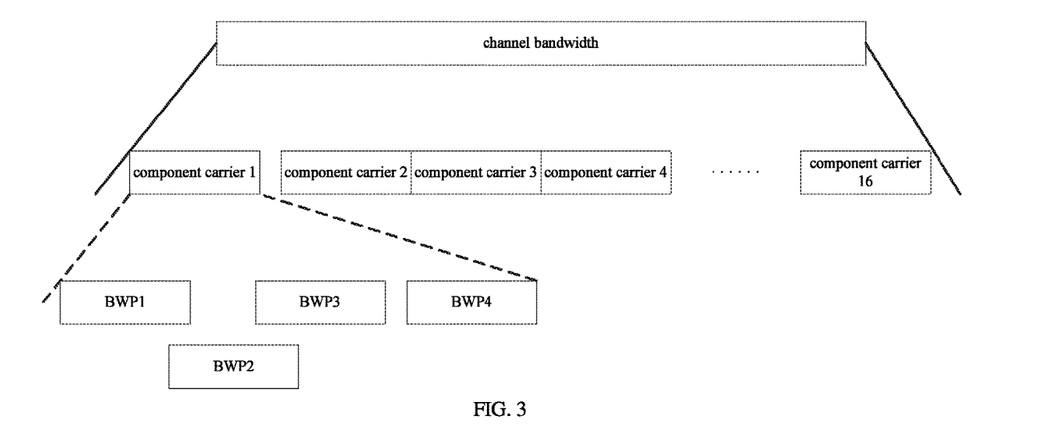
FIG. 3 is an architecture diagram of channel bandwidth in a communication method according to an embodiment of the present disclosure.

It should be noted that, as shown in FIG. 3, the channel bandwidth of the network device may include up to 16 CCs, the CCs may be discontinuous but may not overlap, and multiple CCs may be activated simultaneously. Each CC contains up to 4 BWPs, the BWPs may overlap each other and may be discontinuous, and only one BWP can be activated in one CC.

In order to better understand the present disclosure, the process of obtaining the RMSI by the mobile communication terminal is described here. Specifically, the mobile communication terminal first obtains the SSB. After obtaining the SSB, the mobile communication terminal demodulates indication information in the SSB to obtain configuration information of RMSI CORESET. The configuration information of the RMSI CORESET includes a position of the RMSI CORESET (or, a position of the initial bandwidth part) and so on. RMSI CORESET information is first received according to the configuration information of the RMSI CORESET. The RMSI CORESET information carries indication information indicating indication information of RMSI PDSCH. After obtaining the indication information of RMSI PDSCH, the RMSI PDSCH is received according to the indication information of the RMSI PDSCH, and then RMSI is received and demodulated on the RMSI PDSCH.

Based on the above process of obtaining the RMSI, before the RMSI is obtained, the mode and time point for partitioning the PRGs may be set according to actual needs, which will be described in detail hereinafter.

In a first implementation mode, the PRG partitioning may be performed according to a position of the SSB. Specifically, the foregoing partitioning precoding resource block groups (PRGs) on an initial bandwidth part, includes:

after obtaining a synchronization signal block (SSB), partitioning the PRGs on the initial bandwidth part from a first target position of the SSB, where the first target position is pre-agreed by the protocol.

The first target position may be any position in the SSB according to the protocol. For example, the first target position may be a highest position or a lowest position in the SSB. Generally, the highest position refers to a highest index position of a sub-carrier in a certain resource block, and the lowest position refers to a lowest index position of a sub-carrier in a certain resource block. In one embodiment, the first target position may be the lowest index position or the highest index position of sub-carriers in the resource block of the SSB.

In a second implementation mode, the PRG partitioning may be performed according to a position of the initial bandwidth part. Specifically, the foregoing partitioning precoding resource block groups (PRGs) on an initial bandwidth part, includes:

partitioning the PRGs on the initial bandwidth part from a second target position of the initial bandwidth part, where the second target position is pre-agreed by the protocol.

The second target position may be any position in the initial bandwidth part according to the protocol. For example, the second target position may be a highest position or a lowest position in the initial bandwidth part. In one embodiment, the second target position may be the lowest index position or the highest index position of sub-carriers in the resource block of the initial bandwidth part.

In a third implementation mode, the PRG partitioning may be performed according to a position of RMSI control resource set (CORESET). Specifically, the foregoing partitioning precoding resource block groups (PRGs) on an initial bandwidth part, includes:

after obtaining a synchronization signal block (SSB), partitioning the PRGs on the initial bandwidth part from a target position of RMSI CORESET signaled by the SSB, where the target position of RMSI CORESET is pre-agreed by the protocol.

The target position of RMSI CORESET may be any position in the RMSI CORESET according to the protocol. For example, the target position of RMSI CORESET may be a highest position or a lowest position in the RMSI CORESET. In one embodiment, the target position of RMSI CORESET may be the lowest index position or the highest index position of sub-carriers in the resource block of the RMSI CORESET.

In a fourth implementation mode, the PRG partitioning may be performed according to a position of RMSI physical downlink shared channel (PDSCH). Specifically, the foregoing partitioning precoding resource block groups (PRGs) on an initial bandwidth part, includes:

after obtaining RMSI CORESET information, partitioning the PRGs on the initial bandwidth part from a third target position of RMSI PDSCH indicated by the RMSI CORESET information, where the third target position of RMSI PDSCH is pre-agreed by the protocol.

The third target position of RMSI PDSCH may be any position in the RMSI PDSCH according to the protocol. For example, the third target position of RMSI PDSCH may be a highest position or a lowest position in the RMSI PDSCH. In one embodiment, the third target position of RMSI PDSCH may be the lowest index position or the highest index position of sub-carriers in the resource block of the RMSI PDSCH.

It should be noted that the foregoing four implementation modes may be implemented separately after the SSB is obtained, or may be implemented in combination after the SSB is obtained. For example, the foregoing fourth implementation mode may be combined with any one of the first to third implementation modes, that is, before the mobile communication terminal obtains the RMSI, the PRG partitioning is performed twice, i.e., before obtaining the RMSI control resource set information, one PRG partitioning may be performed according to any one of the first to third implementation modes, and then after obtaining the RMSI control resource set information, another PRG partitioning may be performed according to the fourth implementation mode.

Further, it should be noted that, when partitioning PRGs, a size of each partitioned PRG is equal to a value of a physical resource block bundle size (PRB bundle size). The physical resource block bundle size is used to indicate a granularity of bundle of received resources in the frequency domain estimated by the mobile communication terminal. The physical resource block bundle size may be pre-agreed by the protocol or may be configured by the network device, which is not further limited here.

It should be noted that various optional embodiments described in the embodiments of the present disclosure may be implemented in combination with each other, or may be implemented separately, which is not limited in the embodiments of the present disclosure.

Figure 4:
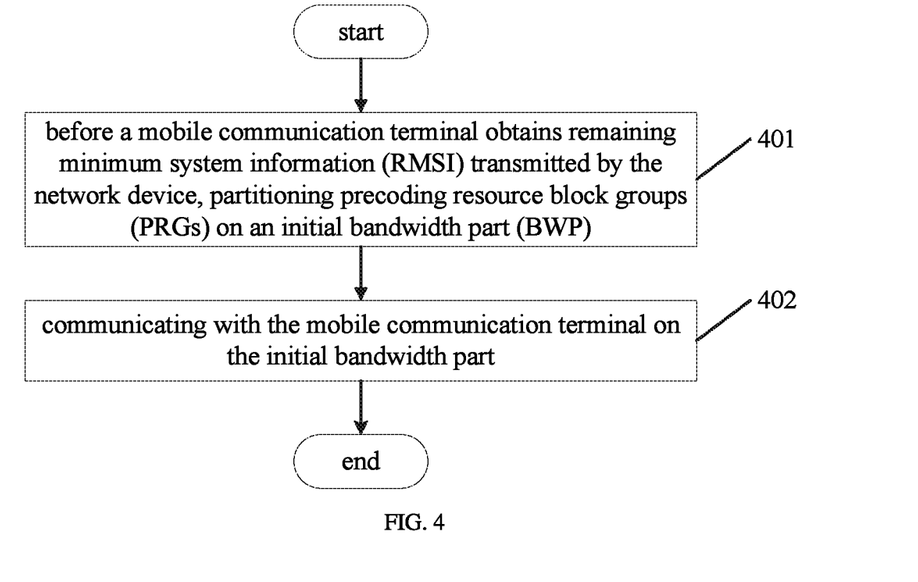
FIG. 4 is a second flowchart of a communication method according to an embodiment of the present disclosure.

Referring to FIG. 4, one embodiment of the present disclosure further provides a communication method. As shown in FIG. 4, the communication method includes the following steps.

Step 401: before a mobile communication terminal obtains remaining minimum system information (RMSI) transmitted by the network device, partitioning precoding resource block groups (PRGs) on an initial bandwidth part (BWP).

The communication method provided in one embodiment of the present disclosure is mainly applied to the network device, and is used for controlling communication between the mobile communication terminal and the network device.

Specifically, the network device may broadcast a synchronization signal block (SSB); and after the mobile communication terminal obtains the SSB, based on the SSB, the mobile communication terminal may perform PRG partitioning on an initial bandwidth part indicated by the SSB. It should be noted that the partitioning manner of PRG may be set according to actual needs, for example, the PRG partitioning may be performed according to a position of the SSB, or the PRG partitioning may be performed according to other related information obtained according to the SSB. For example, the SSB carries indication information of the initial bandwidth part, and then the PRGs may be partitioned according to a position of the initial bandwidth part determined by the indication information.

The initial bandwidth part is a bandwidth part defined by the standard, for example, it may be an initial bandwidth part defined by RAN4.

Step 402: communicating with the mobile communication terminal on the initial bandwidth part.

After partitioning the PRG, data or control information may be transmitted with the network device on the initial bandwidth part based on the partitioned PRG.

In this way, in one embodiment of the present disclosure, before obtaining the RMSI transmitted by the network device, the precoding resource block groups (PRGs) are partitioned on the initial bandwidth part. Therefore, the performance of demodulating resource blocks can be improved according to the embodiment of the present disclosure.

It should be noted that, the above RMSI includes indication information, and the indication information is used to indicate component carrier and bandwidth part (BWP) configured by the network device for the mobile communication terminal. The method further includes:

Step 403: after the mobile communication terminal obtains the RMSI transmitted by the network device, partitioning the PRGs on the BWP from a starting reference point of the component carrier.

Step 404: communicating with the mobile communication terminal on the BWP.

In one embodiment, after obtaining the RMSI transmitted by the network device, partitioning the PRGs on the BWP from the starting reference point of the component carrier is a PRG partitioning rule specified in an existing standard protocol, and specific partitioning modes are not repeated here.

It should be noted that, as shown in FIG. 3, the channel bandwidth of the network device may include up to 16 CCs, the CCs may be discontinuous but may not overlap, and multiple CCs may be activated simultaneously. Each CC contains up to 4 BWPs, the BWPs may overlap each other and may be discontinuous, and only one BWP can be activated in one CC.

In order to better understand the present disclosure, the process of obtaining the RMSI by the mobile communication terminal is described here. Specifically, the mobile communication terminal first obtains the SSB. After obtaining the SSB, the mobile communication terminal demodulates indication information in the SSB to obtain configuration information of RMSI CORESET. The configuration information of the RMSI CORESET includes a position of the RMSI CORESET (or, a position of the initial bandwidth part) and so on. RMSI CORESET information is first received according to the configuration information of the RMSI CORESET. The RMSI CORESET information carries indication information indicating indication information of RMSI PDSCH. After obtaining the indication information of RMSI PDSCH, the RMSI PDSCH is received according to the indication information of the RMSI PDSCH, and then RMSI is received and demodulated on the RMSI PDSCH.

Based on the above process of obtaining the RMSI, before the RMSI is obtained, the mode and time point for partitioning the PRGs may be set according to actual needs, which will be described in detail hereinafter.

In a first implementation mode, the PRG partitioning may be performed according to a position of the SSB. Specifically, the foregoing partitioning precoding resource block groups (PRGs) on an initial bandwidth part, includes:

after obtaining a synchronization signal block (SSB), partitioning the PRGs on the initial bandwidth part from a first target position of the SSB, where the first target position is pre-agreed by the protocol.

The first target position may be any position in the SSB according to the protocol. For example, the first target position may be a highest position or a lowest position in the SSB. Generally, the highest position refers to a highest index position of a sub-carrier in a certain resource block, and the lowest position refers to a lowest index position of a sub-carrier in a certain resource block. In one embodiment, the first target position may be the lowest index position or the highest index position of sub-carriers in the resource block of the SSB.

In a second implementation mode, the PRG partitioning may be performed according to a position of the initial bandwidth part. Specifically, the foregoing partitioning precoding resource block groups (PRGs) on an initial bandwidth part, includes:

partitioning the PRGs on the initial bandwidth part from a second target position of the initial bandwidth part, where the second target position is pre-agreed by the protocol. In one embodiment, the second target position may be the lowest index position or the highest index position of sub-carriers in the resource block of the initial bandwidth part.

The second target position may be any position in the initial bandwidth part according to the protocol. For example, the second target position may be a highest position or a lowest position in the initial bandwidth part.

In a third implementation mode, the PRG partitioning may be performed according to a position of RMSI control resource set (CORESET). Specifically, the foregoing partitioning precoding resource block groups (PRGs) on an initial bandwidth part, includes:

after obtaining a synchronization signal block (SSB), partitioning the PRGs on the initial bandwidth part from a target position of RMSI CORESET signaled by the SSB, where the target position of RMSI CORESET is pre-agreed by the protocol.

The target position of RMSI CORESET may be any position in the RMSI CORESET according to the protocol. For example, the target position of RMSI CORESET may be a highest position or a lowest position in the RMSI CORESET. In one embodiment, the target position of RMSI CORESET may be the lowest index position or the highest index position of sub-carriers in the resource block of the RMSI CORESET.

In a fourth implementation mode, the PRG partitioning may be performed according to a position of RMSI physical downlink shared channel (PDSCH). Specifically, the foregoing partitioning precoding resource block groups (PRGs) on an initial bandwidth part, includes:

after obtaining RMSI CORESET information, partitioning the PRGs on the initial bandwidth part from a third target position of RMSI PDSCH indicated by the RMSI CORESET information, where the third target position of RMSI PDSCH is pre-agreed by the protocol.

The third target position of RMSI PDSCH may be any position in the RMSI PDSCH according to the protocol. For example, the third target position of RMSI PDSCH may be a highest position or a lowest position in the RMSI PDSCH. In one embodiment, the third target position of RMSI PDSCH may be the lowest index position or the highest index position of sub-carriers in the resource block of the RMSI PDSCH.

It should be noted that the foregoing four implementation modes may be implemented separately after the SSB is obtained, or may be implemented in combination after the SSB is obtained. For example, the foregoing fourth implementation mode may be combined with any one of the first to third implementation modes, that is, before the mobile communication terminal obtains the RMSI, the PRG partitioning is performed twice, i.e., before obtaining the RMSI control resource set information, one PRG partitioning may be performed according to any one of the first to third implementation modes, and then after obtaining the RMSI control resource set information, another PRG partitioning may be performed according to the fourth implementation mode.

Further, it should be noted that, when partitioning PRGs, a size of each partitioned PRG is equal to a value of a physical resource block (PRB) bundle size. The physical resource block bundle size is used to indicate a granularity of bundle of received resources in the frequency domain estimated by the mobile communication terminal. The physical resource block bundle size may be pre-agreed by the protocol or may be configured by the network device, which is not further limited here.

It should be noted that various optional embodiments described in the embodiments of the present disclosure may be implemented in combination with each other, or may be implemented separately, which is not limited in the embodiments of the present disclosure.

Figure 5:
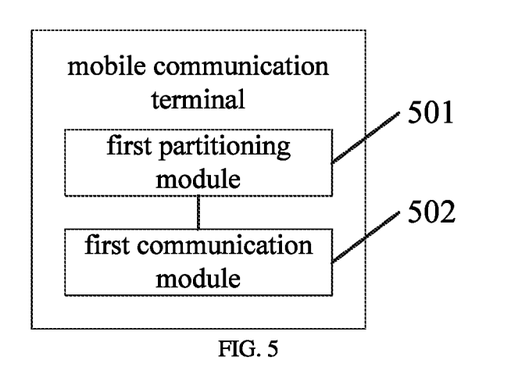
FIG. 5 is a first schematic diagram of a mobile communication terminal according to an embodiment of the present disclosure.

Referring to FIG. 5, FIG. 5 is a schematic diagram of a mobile communication terminal according to an embodiment of the present disclosure. As shown in FIG. 5, the mobile communication terminal includes:

a first partitioning module 501 configured to, before obtaining remaining minimum system information (RMSI) transmitted by a network device, partition precoding resource block groups (PRGs) on an initial bandwidth part (BWP);

a first communication module 502 configured to communicate with the network device on the initial bandwidth part.

Optionally, the RMSI is used to indicate component carrier and bandwidth part (BWP) configured by the network device for the mobile communication terminal. The mobile communication terminal further includes:

a second partitioning module configured to, after obtaining the RMSI transmitted by the network device, partition the PRGs on the BWP from a starting reference point of the component carrier;

a second communication module configured to communicate with the network device on the BWP.

Optionally, the first partitioning module 501 is specifically configured to, after obtaining a synchronization signal block (SSB), partition the PRGs on the initial bandwidth part from a first target position of the SSB, where the first target position is pre-agreed by the protocol.

Optionally, the first target position may be a highest position or a lowest position in the SSB.

Optionally, the first partitioning module 501 is specifically configured to, partition the PRGs on the initial bandwidth part from a second target position of the initial bandwidth part, where the second target position is pre-agreed by the protocol.

Optionally, the second target position may be a highest position or a lowest position in the initial bandwidth part.

Optionally, the first partitioning module 501 is specifically configured to, after obtaining a synchronization signal block (SSB), partition the PRGs on the initial bandwidth part from a target position of RMSI CORESET signaled by the SSB, where the target position of RMSI CORESET is pre-agreed by the protocol.

Optionally, the target position of RMSI CORESET may be a highest position or a lowest position in the RMSI CORESET.

Optionally, the first partitioning module 501 is specifically configured to, after obtaining RMSI CORESET information, partition the PRGs on the initial bandwidth part from a third target position of RMSI PDSCH indicated by the RMSI CORESET information, where the third target position of RMSI PDSCH is pre-agreed by the protocol.

Optionally, the third target position of RMSI PDSCH may be a highest position or a lowest position of the RMSI PDSCH.

Optionally, a size of each partitioned PRG is equal to a physical resource block bundle size.

The mobile communication terminal provided in the embodiment of the present disclosure can implement various processes implemented by the mobile communication terminal in the method embodiments shown in FIG. 2 to FIG. 3, which will not be repeated here to avoid repetition.

Figure 6:
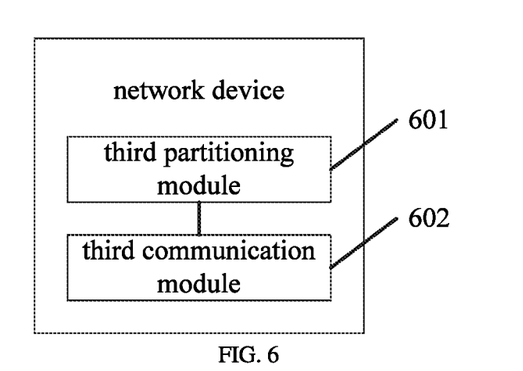
FIG. 6 is a first schematic diagram of a network device according to an embodiment of the present disclosure.

Referring to FIG. 6, FIG. 6 is a schematic diagram of a network device according to an embodiment of the present disclosure. As shown in FIG. 6, the network device includes:

a third partitioning module 601 configured to, before a mobile communication terminal obtains remaining minimum system information (RMSI) transmitted by the network device, partition precoding resource block groups (PRGs) on an initial bandwidth part (BWP);

a third communication module 602 configured to communicate with the mobile communication terminal on the initial bandwidth part.

Optionally, the RMSI is used to indicate component carrier and bandwidth part (BWP) configured by the network device for the mobile communication terminal. The network device further includes:

a fourth partitioning module configured to, after the mobile communication terminal obtains the RMSI transmitted by the network device, partition the PRGs on the BWP from a starting reference point of the component carrier;

a fourth communication module configured to communicate with the mobile communication terminal on the BWP.

Optionally, the third partitioning module 601 is specifically configured to, after obtaining a synchronization signal block (SSB), partition the PRGs on the initial bandwidth part from a first target position of the SSB, where the first target position is pre-agreed by the protocol.

Optionally, the first target position may be a highest position or a lowest position in the SSB.

Optionally, the third partitioning module 601 is specifically configured to, partition the PRGs on the initial bandwidth part from a second target position of the initial bandwidth part, where the second target position is pre-agreed by the protocol.

Optionally, the second target position may be a highest position or a lowest position in the initial bandwidth part.

Optionally, the third partitioning module 601 is specifically configured to, after obtaining a synchronization signal block (SSB), partition the PRGs on the initial bandwidth part from a target position of RMSI CORESET signaled by the SSB, where the target position of RMSI CORESET is pre-agreed by the protocol.

Optionally, the target position of RMSI CORESET may be a highest position or a lowest position in the RMSI CORESET.

Optionally, the third partitioning module 601 is specifically configured to, after obtaining RMSI CORESET information, partition the PRGs on the initial bandwidth part from a third target position of RMSI PDSCH indicated by the RMSI CORESET information, where the third target position of RMSI PDSCH is pre-agreed by the protocol.

Optionally, the third target position of RMSI PDSCH may be a highest position or a lowest position of the RMSI PDSCH.

The network device provided in the embodiment of the present disclosure can implement various processes implemented by the network device in the method embodiments shown in FIG. 4, which will not be repeated here to avoid repetition.

Figure 7:
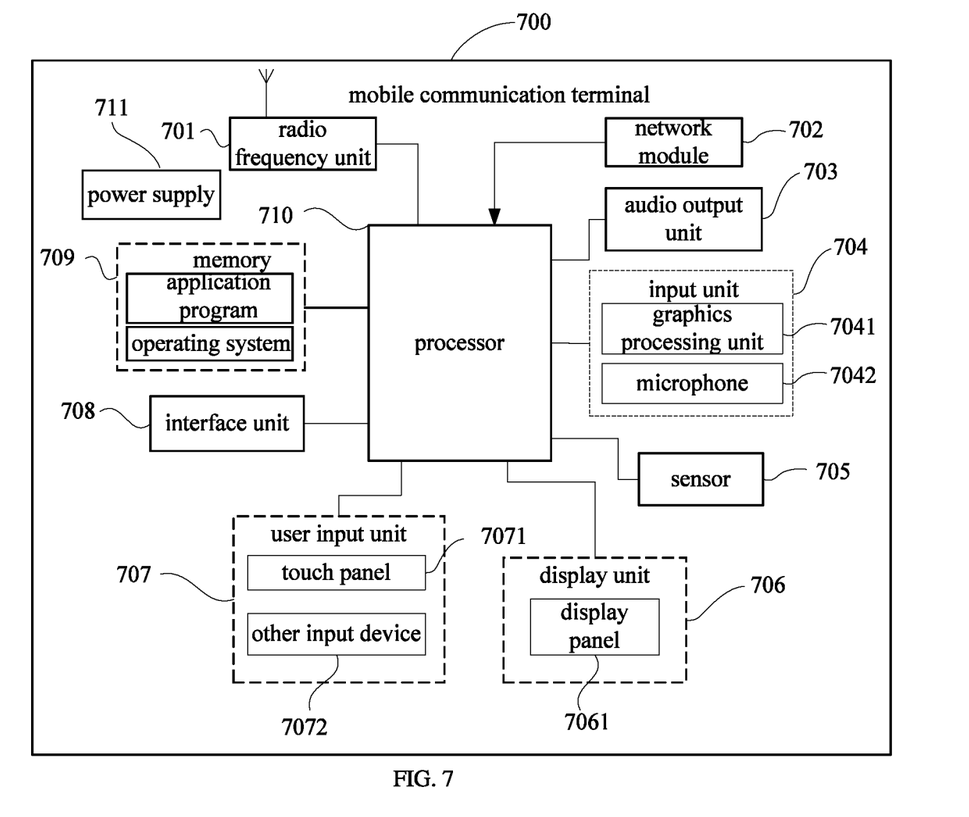
FIG. 7 is a second schematic diagram of a mobile communication terminal according to an embodiment of the present disclosure.

FIG. 7 is a schematic diagram of a hardware structure of a mobile communication terminal implementing various embodiments of the present disclosure.

The mobile communication terminal 700 includes, but is not limited to, a radio frequency unit 701, a network module 702, an audio output unit 703, an input unit 704, a sensor 705, a display unit 706, a user input unit 707, an interface unit 708, a memory 709, a processor 710, and a power supply 711. It will be appreciated by those skilled in the art that structures of the mobile communication terminal shown in FIG. 7 do not constitute a limitation of a mobile communication terminal, which may include more or fewer components than illustrated, or have some components combined, or different component arrangements. In one embodiment of the present disclosure, the mobile communication terminal includes, but is not limited to, a mobile phone, a tablet computer, a notebook computer, a palmtop computer, an in-vehicle terminal, a wearable device, a pedometer, and the like.

The processor 710 is configured to, before obtaining remaining minimum system information (RMSI) transmitted by a network device, partition precoding resource block groups (PRGs) on an initial bandwidth part (BWP).

The radio frequency unit 701 is configured to communicate with the network device on the initial bandwidth part.

Optionally, the RMSI is used to indicate component carrier and bandwidth part (BWP) configured by the network device for the mobile communication terminal. The processor 710 is configured to, after obtaining the RMSI transmitted by the network device, partition the PRGs on the BWP from a starting reference point of the component carrier.

The radio frequency unit 701 is configured to communicate with the network device on the BWP.

Optionally, the processor 710 is specifically configured to, after obtaining a synchronization signal block (SSB), partition the PRGs on the initial bandwidth part from a first target position of the SSB, where the first target position is pre-agreed by the protocol.

Optionally, the first target position may be a highest position or a lowest position in the SSB.

Optionally, the processor 710 is specifically configured to, partition the PRGs on the initial bandwidth part from a second target position of the initial bandwidth part where the second target position is pre-agreed by the protocol.

Optionally, the second target position may be a highest position or a lowest position in the initial bandwidth part.

Optionally, the processor 710 is specifically configured to, after obtaining a synchronization signal block (SSB), partition the PRGs on the initial bandwidth part from a target position of RMSI CORESET signaled by the SSB, where the target position of RMSI CORESET is pre-agreed by the protocol.

Optionally, the target position of RMSI CORESET may be a highest position or a lowest position in the RMSI CORESET.

Optionally, the processor 710 is specifically configured to, after obtaining RMSI CORESET information, partition the PRGs on the initial bandwidth part from a third target position of RMSI PDSCH indicated by the RMSI CORESET information, where the third target position of RMSI PDSCH is pre-agreed by the protocol.

Optionally, the third target position of RMSI PDSCH may be a highest position or a lowest position of the RMSI PDSCH.

Optionally, a size of each partitioned PRG is equal to a physical resource block bundle size.

In this way, in one embodiment of the present disclosure, before obtaining the RMSI transmitted by the network device, the precoding resource block groups (PRGs) are partitioned on the initial bandwidth part. Therefore, the performance of demodulating resource blocks can be improved according to the embodiment of the present disclosure.

It should be understood that in some embodiments of the present disclosure, the radio frequency unit 701 may be used to receive and transmit signals during receiving and transmitting information or a call. Specifically, the radio frequency unit 701 receives downlink data from a base station and then transmits the downlink data to the processor 710 for processing. Uplink data is transmitted to the base station. Generally, the radio frequency unit 701 includes, but is not limited to, an antenna, at least one amplifier, a transceiver, a coupler, a low noise amplifier, a duplexer, and the like. In addition, the radio frequency unit 701 may also communicate with the network and other devices through a wireless communication system.

The mobile communication terminal provides wireless broadband internet access to the user through the network module 702, such as assisting the user in receiving and transmitting email, browsing web pages, and accessing streaming media.

The audio output unit 703 may convert the audio data received by the radio frequency unit 701 or the network module 702 or stored in the memory 709 into an audio signal and output as sound. Moreover, the audio output unit 703 may also provide audio output (e.g., call signal reception sound, message reception sound, etc.) related to a specific function performed by the user terminal 700. The audio output unit 703 includes a speaker, a buzzer, a receiver, and the like.

The input unit 704 is used for receiving an audio or video signal. The input unit 704 may include a Graphics Processing Unit (GPU) 7041 and a microphone 7042. The GPU 7041 processes image data of static pictures or videos obtained by an image capturing apparatus (such as a camera) in a video capturing mode or an image capturing mode. The processed image frame may be displayed on the display unit 706. The image frames processed by the graphics processor 7041 may be stored in the memory 709 (or other storage medium) or transmitted via the radio frequency unit 701 or the network module 702. The microphone 7042 can receive sound and can process such sound into audio data. The processed audio data may be converted into a format output that may be transmitted to the mobile communication base station via the radio frequency unit 701 in the case of a telephone talk mode.

The mobile communication terminal 700 further includes at least one sensor 705, such as a light sensor, a motion sensor, and other sensors. Specifically, the light sensor includes an ambient light sensor and a proximity sensor. The ambient light sensor can adjust brightness of a display panel 7061 according to the brightness of the ambient light. The proximity sensor can turn off the display panel 7061 and/or backlight when the mobile communication terminal 700 moves to the ear. As one of the motion sensors, an accelerometer sensor can detect the magnitude of the acceleration in each direction (generally three axes), can detect the magnitude and direction of the gravity when stationary, and can be used to identify the attitude of the user terminal (such as horizontal/vertical screen switching, related games, magnetometer attitude calibration), vibration identification related functions (such as pedometer, knocking), and the like. The sensor 705 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 706 is used to display information input by or provided to the user. The display unit 706 may include a display panel 7061, which may be configured in the form of a Liquid Crystal Display (LCD), an Organic Light-Emitting Diode (OLED), or the like.

The user input unit 707 may be used to receive the input number or character information, and to generate a key signal input related to the user setting and the function control of the user terminal. Specifically, the user input unit 707 includes a touch panel 7071 and other input devices 7072. The touch panel 7071, also referred to as a touch screen, may collect touch operations on or near the touch panel (e.g., operations on or near the touch panel 7071 using any suitable object or accessory, such as a finger, stylus, or the like). The touch panel 7071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 710, receives commands from the processor 710 and execute them. In addition, the touch panel 7071 may be implemented in various types such as a resistive type, a capacitive type, an infrared ray, and a surface acoustic wave. In addition to the touch panel 7071, the user input unit 707 may further include other input devices 7072. Specifically, other input devices 7072 may include, but are not limited to, a physical keyboard, a function key (such as a volume control key, an on-off key), a trackball, a mouse, and a joystick, which will not be elaborated herein.

Further, the touch panel 7071 may be overlaid on the display panel 7061. When the touch panel 7071 detects a touch operation on or near the touch panel, the touch panel 7071 transmits it to the processor 710 to determine a type of a touch event. Then, the processor 710 provides a corresponding visual output on the display panel 7061 according to the type of the touch event. Although in FIG. 7, the touch panel 7071 and the display panel 7061 are implemented as two separate components to implement the input and output functions of the user terminal, in some embodiments, the touch panel 7071 and the display panel 7061 may be integrated to implement the input and output functions of the user terminal, which are not specifically limited herein.

The interface unit 708 is an interface through which an external device is connected to the mobile communication terminal 700. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 708 may be used to receive input (e.g., data information, power, etc.) from the external device and transmit the received input to one or more elements within the mobile communication terminal 700 or may be used to transmit data between the mobile communication terminal 700 and the external device.

The memory 709 may be used to store software programs and various data. The memory 709 may mainly include a program storage area and a data storage area. The program storage area may store an operating system, an application program (such as a sound play function, an image play function) required by at least one function, and the like. The data storage area may store data (such as audio data, a phone book) created according to use of the mobile communication terminal. In addition, the memory 709 may include high speed random access memory, and may also include non-volatile memory, such as at least one magnetic disk storage device, flash memory device, or other volatile solid state storage device.

The processor 710 is a control center of the user terminal, connects various parts of the entire user terminal by various interfaces and lines, executes various functions of the user terminal and processes data by running or executing software programs and/or modules stored in the memory 709 and invoking data stored in the memory 709, thereby performing overall monitoring of the mobile communication terminal. The processor 710 may include one or more processing units. Optionally, the processor 710 may integrate an application processor and a modem processor. The application processor primarily processes the operating system, the user interface and the application program. The modem processor primarily processes wireless communications. It will be appreciated that the modem processor may also not be integrated into the processor 710.

The mobile communication terminal 700 may further include a power source 711 (such as a battery) that supplies power to the various components. Optionally, the power source 711 may be logically connected to the processor 710 through a power management system to perform functions such as managing charging, discharging, and power consumption management through the power management system.

In addition, the mobile communication terminal 700 includes functional modules not shown, which will not be elaborated herein.

Optionally, one embodiment of the present disclosure further provides a mobile communication terminal including a processor 710, a memory 709, and a computer program stored in the memory 709 and executable on the processor 710. When the computer program is executed by the processor 710, each of the processes in the communication method of the above embodiment is implemented, and the same technical effect can be achieved. To avoid repetition, details are not described herein.

Figure 8:
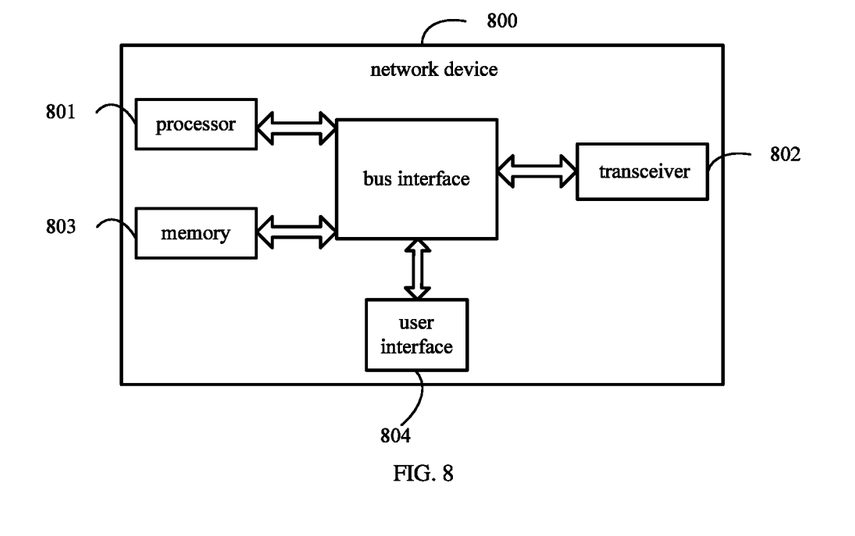
FIG. 8 is a second schematic diagram of a network device according to an embodiment of the present disclosure.

Referring to FIG. 8, FIG. 8 is a schematic diagram of a network device according to an embodiment of the present disclosure, which can realize the details of the communication method in the above embodiment and achieve the same effect. As shown in FIG. 8, the network device 800 includes: a processor 801, a transceiver 802, a memory 803, a user interface 804 and a bus interface.

The processor 801 is configured to read programs in the memory 803 to implement: before a mobile communication terminal obtains remaining minimum system information (RMSI) transmitted by a network device, partitioning precoding resource block groups (PRGs) on an initial bandwidth part (BWP).

In FIG. 8, the bus architecture may include any number of interconnected buses and bridges. Specifically, various circuits of one or more processors, which are represented by the processor 801, and the storage, which is represented by the memory 803, are linked together. The bus architecture may link various other circuits, such as a peripheral device, voltage regulator and a power management circuit together. These features are well known in this field, therefore, this disclosure does not make further description on these features. The bus interface provides an interface. The transceiver 802 may be multiple elements, including a transmitter and a receiver and provide units, which communicate with other devices on the transmission medium. For different UEs, a user interface 804 may also be an interface capable of externally/internally connecting required devices which may include a keyboard, a monitor, a speaker, microphone, joystick.

The processor 801 is responsible for managing the bus architecture and common processing and the memory 803 may store data used by the processor 801 when executing the operations.

Optionally, the RMSI is used to indicate component carrier and bandwidth part (BWP) configured by the network device for the mobile communication terminal. The processor 801 is configured to read programs in the memory 803 to implement: after obtaining the RMSI transmitted by the network device, partitioning the PRGs on the BWP from a starting reference point of the component carrier; communicating with the network device on the BWP.

Optionally, the processor 801 is configured to read programs in the memory 803 to implement the following steps: after obtaining a synchronization signal block (SSB), partitioning the PRGs on the initial bandwidth part from a first target position of the SSB, where the first target position is pre-agreed by the protocol.

Optionally, the first target position may be a highest position or a lowest position in the SSB.

Optionally, the processor 801 is configured to read programs in the memory 803 to implement the following steps: partitioning the PRGs on the initial bandwidth part from a second target position of the initial bandwidth part, where the second target position is pre-agreed by the protocol.

Optionally, the second target position may be a highest position or a lowest position in the initial bandwidth part.

Optionally, the processor 801 is configured to read programs in the memory 803 to implement the following steps: after obtaining a synchronization signal block (SSB), partitioning the PRGs on the initial bandwidth part from a target position of RMSI CORESET signaled by the SSB, where the target position of RMSI CORESET is pre-agreed by the protocol.

Optionally, the target position of RMSI CORESET may be a highest position or a lowest position in the RMSI CORESET.

Optionally, the processor 801 is configured to read programs in the memory 803 to implement the following steps: after obtaining RMSI CORESET information, partitioning the PRGs on the initial bandwidth part from a third target position of RMSI PDSCH indicated by the RMSI CORESET information, where the third target position of RMSI PDSCH is pre-agreed by the protocol.

Optionally, the third target position of RMSI PDSCH may be a highest position or a lowest position of the RMSI PDSCH.

Optionally, a size of each partitioned PRG is equal to a physical resource block bundle size.

In this way, in one embodiment of the present disclosure, before obtaining the RMSI transmitted by the network device, the precoding resource block groups (PRGs) are partitioned on the initial bandwidth part. Therefore, the performance of demodulating resource blocks can be improved according to the embodiment of the present disclosure.

One embodiment of the present disclosure further provides a computer readable storage medium including a computer program stored thereon. The computer program is executed by a processor to implement each process of the above communication method, and the same technical effect can be achieved. To avoid repetition, details are not described herein. The computer readable storage medium may be a volatile memory or a non-volatile memory, or may include both volatile and non-volatile memory, such as a read-only memory (ROM), a random access memory (RAM), a magnetic disk, or an optical disk.

Persons having ordinary skill in the art may obtain that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., partitioning of the unit is only a logical partitioning, there may be additional partitioning methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

The above is only the specific embodiments of the present disclosure, but the protection scope of the present disclosure is not limited thereto. It should be pointed out that, for persons having ordinary skill in the art, several improvements and changes may be made, without departing from the principle of the present disclosure. These improvements and changes should also be within the scope of the present disclosure.

What is claimed is:

1. A communication method applied to a mobile communication terminal, comprising:
    before obtaining remaining minimum system information (RMSI) transmitted by a network device, partitioning precoding resource block groups (PRGs) on an initial bandwidth part (BWP); and
    communicating with the network device on the initial bandwidth part.

2. The method according to claim 1, wherein the RMSI is used to indicate a component carrier and a bandwidth part (BWP) configured by the network device for the mobile communication terminal, the method further comprises:
    after obtaining the RMSI transmitted by the network device, partitioning the PRGs on the BWP from a starting reference point of the component carrier.

3. The method according to claim 1, wherein the partitioning precoding resource block groups (PRGs) on an initial bandwidth part (BWP), comprises: after obtaining a synchronization signal and PBCH block (SSB), partitioning the PRGs on the initial bandwidth part from a first target position of the SSB, wherein the first target position is pre-agreed by the protocol; or,
    wherein the partitioning precoding resource block groups (PRGs) on an initial bandwidth part (BWP), comprises: partitioning the PRGs on the initial bandwidth part from a second target position of the initial bandwidth part, wherein the second target position is pre-agreed by the protocol; or,
    wherein the partitioning precoding resource block groups (PRGs) on an initial bandwidth part (BWP), comprises: after obtaining RMSI control resource set (CORESET) information, partitioning the PRGs on the initial bandwidth part from a third target position of RMSI physical downlink shared channel (PDSCH) indicated by the RMSI CORESET information, wherein the third target position of RMSI physical downlink shared channel is pre-agreed by the protocol.

4. The method according to claim 3, wherein the first target position is a highest position or a lowest position in the SSB; or,
    wherein the second target position is a highest position or a lowest position in the initial bandwidth part; or,
    wherein the third target position of RMSI physical downlink shared channel is a highest position or a lowest position in the RMSI PDSCH.

5. The method according to claim 1, wherein the partitioning precoding resource block groups (PRGs) on an initial bandwidth part (BWP), comprises:
    after obtaining a synchronization signal and PBCH block (SSB), partitioning the PRGs on the initial bandwidth part from a target position of RMSI control resource set (CORESET) signaled by the SSB, wherein the target position RMSI control resource set is pre-agreed by the protocol.

6. The method according to claim 5, wherein the target position of RMSI control resource set is a highest position or a lowest position in the RMSI CORESET.

7. The method according to claim 1, wherein a size of each partitioned PRG is equal to a physical resource block (PRB) bundle size.

8. A communication method applied to a network device, comprising:
    before a mobile communication terminal obtains remaining minimum system information (RMSI) transmitted by the network device, partitioning precoding resource block groups (PRGs) on an initial bandwidth part (BWP);
    communicating with the mobile communication terminal on the initial bandwidth part.

9. The method according to claim 8, wherein the RMSI is used to indicate a component carrier and a bandwidth part (BWP) configured by the network device for the mobile communication terminal, the method further comprises:
    after the mobile communication terminal obtains the RMSI transmitted by the network device, partitioning the PRGs on the BWP from a starting reference point of the component carrier.

10. The method according to claim 8, wherein the partitioning precoding resource block groups (PRGs) on an initial bandwidth part (BWP), comprises: after obtaining a synchronization signal and PBCH block (SSB), partitioning the PRGs on the initial bandwidth part from a first target position of the SSB, wherein the first target position is pre-agreed by the protocol; or,
    wherein the partitioning precoding resource block groups (PRGs) on an initial bandwidth part (BWP), comprises: partitioning the PRGs on the initial bandwidth part from a second target position of the initial bandwidth part, wherein the second target position is pre-agreed by the protocol; or,
    wherein the partitioning precoding resource block groups (PRGs) on an initial bandwidth part (BWP), comprises: after obtaining RMSI control resource set (CORESET) information, partitioning the PRGs on the initial bandwidth part from a third target position of RMSI physical downlink shared channel (PDSCH) indicated by the RMSI CORESET information, wherein the third target position of RMSI physical downlink shared channel is pre-agreed by the protocol.

11. The method according to claim 10, wherein the first target position is a highest position or a lowest position in the SSB; or,
    wherein the second target position is a highest position or a lowest position in the initial bandwidth part; or,
    wherein the third target position of RMSI physical downlink shared channel is a highest position or a lowest position in the RMSI PDSCH.

12. The method according to claim 8, wherein the partitioning precoding resource block groups (PRGs) on an initial bandwidth part (BWP), comprises:
    after obtaining a synchronization signal and PBCH block (SSB), partitioning the PRGs on the initial bandwidth part from a target position of RMSI control resource set (CORESET) signaled by the SSB, wherein the target position of RMSI control resource set is pre-agreed by the protocol.

13. The method according to claim 12, wherein the target position of RMSI control resource set is a highest position or a lowest position in the RMSI CORESET.

14. The method according to claim 8, wherein a size of each partitioned PRG is equal to a physical resource block (PRB) bundle size.

15. A network device, comprising: a processor, a memory, and a computer program stored on the memory and executable on the processor; wherein the computer program is executed by the processor to implement steps of the communication method according to claim 8.

16. A mobile communication terminal, comprising: a processor, a memory, and a computer program stored on the memory and executable on the processor; wherein the processor executes the computer program to,
 before obtaining remaining minimum system information (RMSI) transmitted by a network device, partition precoding resource block groups (PRGs) on an initial bandwidth part (BWP); and
 communicate with the network device on the initial bandwidth part.

17. The mobile communication terminal according to claim 16, wherein the RMSI is used to indicate a component carrier and a bandwidth part (BWP) configured by the network device for the mobile communication terminal, the processor executes the computer program to,
 after obtaining the RMSI transmitted by the network device, partition the PRGs on the BWP from a starting reference point of the component carrier.

18. The mobile communication terminal according to claim 16, wherein the processor executes the computer program to,
 after obtaining a synchronization signal and PBCH block (SSB), partition the PRGs on the initial bandwidth part from a target position of RMSI control resource set (CORESET) signaled by the SSB, wherein the target position of RMSI control resource set is pre-agreed by the protocol.

19. The mobile communication terminal according to claim 18, wherein the target position of RMSI control resource set is a highest position or a lowest position in the RMSI CORESET.

20. The mobile communication terminal according to claim 16, wherein the processor executes the computer program to perform at least one of:
 after obtaining a synchronization signal and PBCH block (SSB), partitioning the PRGs on the initial bandwidth part from a first target position of the SSB, wherein the first target position is pre-agreed by the protocol; or,
 partitioning the PRGs on the initial bandwidth part from a second target position of the initial bandwidth part, wherein the second target position is pre-agreed by the protocol; or,
 after obtaining RMSI control resource set (CORESET) information, partitioning the PRGs on the initial bandwidth part from a third target position of RMSI physical downlink shared channel (PDSCH) indicated by the RMSI CORESET information, wherein the third target position of RMSI physical downlink shared channel is pre-agreed by the protocol.

\* \* \* \* \*